United States Patent
Singh et al.

(10) Patent No.: US 11,829,727 B2
(45) Date of Patent: *Nov. 28, 2023

(54) CROSS-LINGUAL REGULARIZATION FOR MULTILINGUAL GENERALIZATION

(71) Applicant: salesforce.com, inc., San Francisco, CA (US)

(72) Inventors: Jasdeep Singh, San Francisco, CA (US); Nitish Shirish Keskar, San Bruno, CA (US); Bryan McCann, Palo Alto, CA (US)

(73) Assignee: salesforce.com, inc., San Francisco, CA (US)

( * ) Notice: Subject to any disclaimer, the term of this patent is extended or adjusted under 35 U.S.C. 154(b) by 294 days.

This patent is subject to a terminal disclaimer.

(21) Appl. No.: 17/239,297

(22) Filed: Apr. 23, 2021

(65) Prior Publication Data

US 2021/0240943 A1    Aug. 5, 2021

Related U.S. Application Data

(63) Continuation of application No. 16/399,429, filed on Apr. 30, 2019, now Pat. No. 11,003,867.

(Continued)

(51) Int. Cl.
*G06F 40/00* (2020.01)
*G06F 40/58* (2020.01)
(Continued)

(52) U.S. Cl.
CPC .............. *G06F 40/58* (2020.01); *G06F 40/51* (2020.01); *G06N 3/08* (2013.01); *G06N 20/00* (2019.01)

(58) Field of Classification Search
CPC .......... G06F 40/58; G06F 40/51; G06F 40/30; G06F 40/44; G06F 40/47; G06F 40/126;
(Continued)

(56) References Cited

U.S. PATENT DOCUMENTS

| 8,345,984 B2 | 1/2013 | Ji et al. |
| 9,672,474 B2 | 6/2017 | Dirac et al. |

(Continued)

OTHER PUBLICATIONS

D. R. Kubal and A. V. Nimkar, "A Hybrid Deep Learning Architecture for Paraphrase Identification," 2018 9th International Conference on Computing, Communication and Networking Technologies (ICCCNT), Bengaluru, India, 2018, pp. 1-6, doi: 10.1109/ICCCNT.2018.8493752 (Year: 2018).*

(Continued)

*Primary Examiner* — Edgar X Guerra-Erazo
(74) *Attorney, Agent, or Firm* — HAYNES AND BOONE LLP

(57) ABSTRACT

Approaches for cross-lingual regularization for multilingual generalization include a method for training a natural language processing (NLP) deep learning module. The method includes accessing a first dataset having a first training data entry, the first training data entry including one or more natural language input text strings in a first language; translating at least one of the one or more natural language input text strings of the first training data entry from the first language to a second language; creating a second training data entry by starting with the first training data entry and substituting the at least one of the natural language input text strings in the first language with the translation of the at least one of the natural language input text strings in the second language; adding the second training data entry to a second dataset; and training the deep learning module using the second dataset.

20 Claims, 8 Drawing Sheets

Related U.S. Application Data

(60) Provisional application No. 62/813,691, filed on Mar. 4, 2019.

(51) Int. Cl.
*G06N 20/00* (2019.01)
*G06N 3/08* (2023.01)
*G06F 40/51* (2020.01)

(58) Field of Classification Search
CPC ....... G06F 40/205; G06F 40/289; G06N 3/08; G06N 3/0445; G06N 3/0454; G06N 20/00
See application file for complete search history.

(56) References Cited

U.S. PATENT DOCUMENTS

| | | | |
|---|---|---|---|
| 10,282,663 | B2 | 5/2019 | Socher et al. |
| 10,346,721 | B2 | 7/2019 | Albright et al. |
| 10,452,992 | B2 | 10/2019 | Lee et al. |
| 10,474,709 | B2 | 11/2019 | Paulus |
| 10,521,465 | B2 | 12/2019 | Paulus |
| 10,542,270 | B2 | 1/2020 | Zhou et al. |
| 10,546,217 | B2 | 1/2020 | Albright et al. |
| 10,558,750 | B2 | 2/2020 | Lu et al. |
| 10,565,305 | B2 | 2/2020 | Lu et al. |
| 10,565,306 | B2 | 2/2020 | Lu et al. |
| 10,565,318 | B2 | 2/2020 | Bradbury |
| 10,565,493 | B2 | 2/2020 | Merity et al. |
| 10,573,295 | B2 | 2/2020 | Zhou et al. |
| 10,592,767 | B2 | 3/2020 | Trott et al. |
| 10,699,060 | B2 | 6/2020 | McCann |
| 10,747,761 | B2 | 8/2020 | Zhong et al. |
| 10,776,581 | B2 | 9/2020 | McCann et al. |
| 10,783,875 | B2 | 9/2020 | Hosseini-Asl et al. |
| 10,817,650 | B2 | 10/2020 | McCann et al. |
| 10,839,284 | B2 | 11/2020 | Hashimoto et al. |
| 10,846,478 | B2 | 11/2020 | Lu et al. |
| 10,902,289 | B2 | 1/2021 | Gao et al. |
| 10,909,157 | B2 | 2/2021 | Paulus et al. |
| 10,929,607 | B2 | 2/2021 | Zhong et al. |
| 10,958,925 | B2 | 3/2021 | Zhou et al. |
| 10,963,652 | B2 | 3/2021 | Hashimoto et al. |
| 10,963,782 | B2 | 3/2021 | Xiong et al. |
| 10,970,486 | B2 | 4/2021 | Machado et al. |
| 11,003,867 | B2 * | 5/2021 | Singh ................. G06N 3/08 |
| 2003/0101161 | A1 | 5/2003 | Ferguson et al. |
| 2011/0182469 | A1 | 7/2011 | Ji et al. |
| 2015/0379428 | A1 | 12/2015 | Dirac et al. |
| 2015/0379429 | A1 | 12/2015 | Lee et al. |
| 2015/0379430 | A1 | 12/2015 | Dirac et al. |
| 2016/0350288 | A1 * | 12/2016 | Wick ................. G06F 40/44 |
| 2016/0350653 | A1 | 12/2016 | Socher et al. |
| 2017/0024645 | A1 | 1/2017 | Socher et al. |
| 2017/0032280 | A1 | 2/2017 | Socher |
| 2017/0140240 | A1 | 5/2017 | Socher et al. |
| 2018/0082171 | A1 | 3/2018 | Merity et al. |
| 2018/0096219 | A1 | 4/2018 | Socher |
| 2018/0121787 | A1 | 5/2018 | Hashimoto et al. |
| 2018/0121788 | A1 | 5/2018 | Hashimoto et al. |
| 2018/0121799 | A1 | 5/2018 | Hashimoto et al. |
| 2018/0129931 | A1 | 5/2018 | Bradbury et al. |
| 2018/0129937 | A1 | 5/2018 | Bradbury et al. |
| 2018/0129938 | A1 | 5/2018 | Xiong et al. |
| 2018/0143966 | A1 | 5/2018 | Lu et al. |
| 2018/0144208 | A1 | 5/2018 | Lu et al. |
| 2018/0144248 | A1 | 5/2018 | Lu et al. |
| 2018/0165554 | A1 | 6/2018 | Zhang et al. |
| 2018/0268287 | A1 | 9/2018 | Johansen et al. |
| 2018/0268298 | A1 | 9/2018 | Johansen et al. |
| 2018/0300317 | A1 | 10/2018 | Bradbury |
| 2018/0300400 | A1 | 10/2018 | Paulus |
| 2018/0336198 | A1 | 11/2018 | Zhong et al. |
| 2018/0336453 | A1 | 11/2018 | Merity et al. |
| 2018/0349359 | A1 | 12/2018 | McCann et al. |
| 2018/0373682 | A1 | 12/2018 | McCann et al. |
| 2018/0373987 | A1 | 12/2018 | Zhang et al. |
| 2019/0130206 | A1 | 5/2019 | Trott et al. |
| 2019/0130248 | A1 | 5/2019 | Zhong et al. |
| 2019/0130249 | A1 | 5/2019 | Bradbury et al. |
| 2019/0130273 | A1 | 5/2019 | Keskar et al. |
| 2019/0130312 | A1 | 5/2019 | Xiong et al. |
| 2019/0130896 | A1 | 5/2019 | Zhou et al. |
| 2019/0130897 | A1 | 5/2019 | Zhou et al. |
| 2019/0149834 | A1 | 5/2019 | Zhou et al. |
| 2019/0188568 | A1 | 6/2019 | Keskar et al. |
| 2019/0213482 | A1 | 7/2019 | Socher et al. |
| 2019/0251168 | A1 | 8/2019 | McCann et al. |
| 2019/0251431 | A1 | 8/2019 | Keskar et al. |
| 2019/0258714 | A1 | 8/2019 | Zhong et al. |
| 2019/0258901 | A1 | 8/2019 | Albright et al. |
| 2019/0258939 | A1 | 8/2019 | Min et al. |
| 2019/0286073 | A1 | 9/2019 | Asl et al. |
| 2019/0295530 | A1 | 9/2019 | Hosseini-Asl et al. |
| 2019/0355270 | A1 | 11/2019 | McCann et al. |
| 2019/0362246 | A1 | 11/2019 | Lin et al. |
| 2020/0005765 | A1 | 1/2020 | Zhou et al. |
| 2020/0065651 | A1 | 2/2020 | Merity et al. |
| 2020/0090033 | A1 | 3/2020 | Ramachandran et al. |
| 2020/0090034 | A1 | 3/2020 | Ramachandran et al. |
| 2020/0103911 | A1 | 4/2020 | Ma et al. |
| 2020/0104643 | A1 | 4/2020 | Hu et al. |
| 2020/0104699 | A1 | 4/2020 | Zhou et al. |
| 2020/0105272 | A1 | 4/2020 | Wu et al. |
| 2020/0117854 | A1 | 4/2020 | Lu et al. |
| 2020/0117861 | A1 | 4/2020 | Bradbury |
| 2020/0142917 | A1 | 5/2020 | Paulus |
| 2020/0175305 | A1 | 6/2020 | Trott et al. |
| 2020/0234113 | A1 | 7/2020 | Liu |
| 2020/0272940 | A1 | 8/2020 | Sun et al. |
| 2020/0285704 | A1 | 9/2020 | Rajani et al. |
| 2020/0285705 | A1 | 9/2020 | Zheng et al. |
| 2020/0285706 | A1 | 9/2020 | Singh et al. |
| 2020/0285993 | A1 | 9/2020 | Liu et al. |
| 2020/0302178 | A1 | 9/2020 | Gao et al. |
| 2020/0334334 | A1 | 10/2020 | Keskar et al. |
| 2020/0364299 | A1 | 11/2020 | Niu et al. |
| 2020/0364542 | A1 | 11/2020 | Sun |
| 2020/0364580 | A1 | 11/2020 | Shang et al. |
| 2020/0372116 | A1 | 11/2020 | Gao et al. |
| 2020/0372319 | A1 | 11/2020 | Sun et al. |
| 2020/0372339 | A1 | 11/2020 | Che et al. |
| 2020/0372341 | A1 | 11/2020 | Asai et al. |
| 2020/0380213 | A1 | 12/2020 | McCann et al. |
| 2021/0042604 | A1 | 2/2021 | Hashimoto et al. |
| 2021/0049236 | A1 | 2/2021 | Nguyen et al. |
| 2021/0073459 | A1 | 3/2021 | McCann et al. |
| 2021/0089588 | A1 | 3/2021 | Le et al. |
| 2021/0089882 | A1 | 3/2021 | Sun et al. |
| 2021/0089883 | A1 | 3/2021 | Li et al. |

OTHER PUBLICATIONS

J. Zhao, M. Lan, Z. - Y. Niu and D. Ji, "Recognizing cross-lingual textual entailment with co-training using similarity and difference views," 2014 International Joint Conference on Neural Networks (IJCNN), Beijing, China, 2014, pp. 3705-3712, doi: 10.1109/IJCNN. 2014.6889713. (Year: 2014).*
Ammar et al., "Many Languages, One Parser," Transactions of the Association for Computational Linguistics, 4:431-444, 2016.
Artetxe et al., "A Robust Self-Learning Method for Fully Unsupervised Cross-Lingual Mappings of Word Embeddings," arXiv preprint arXiv:1805.06297, pp. 1-10, 2018.
Artetxe et al., "Massively Multilingual Sentence Embeddings for Zeroshot Cross-Lingual Transfer and Beyond," arXiv preprint arXiv:1812.10464, pp. 1-15, 2018.
Asai et al., "Multilingual Extractive Reading Comprehension by Runtime Machine Translation," arXiv preprint arXiv:1809.03275, pp. 1-9, 2018.
Bojanowski et al., "Enriching Word Vectors with Subword Information," Transactions of the Association for Computational Linguistics, 5:135-146, 2017.

(56) References Cited

OTHER PUBLICATIONS

Bojar et al., "Findings of the 2018 Conference on Machine Translation (WMT18)," In Proceedings of the Third Conference on Machine Translation, vol. 2: Shared Task Papers, pp. 272-307, Belgium, Brussels. Association for Computational Linguistics, 2018.
Conneau et al., "Supervised Learning of Universal Sentence Representations from Natural Language Inference Data," arXiv preprint arXiv:1705.02364, pp. 1-11, 2017a.
Conneau et al., "Word Translation without Parallel Data," arXiv preprint arXiv:1710.04087, pp. 1-14, 2017b.
Conneau et al., "XNLI: Evaluating Cross-lingual Sentence Representations," arXiv preprint arXiv:1809.05053, pp. 1-12, 2018.
Devlin et al., "BERT: Pre-training of Deep Bidirectional Transformers for Language Understanding," arXiv preprint arXiv:1810.04805, pp. 1-14, 2018.
Eriguchi et al., Zeroshot Cross-lingual Classification using Multilingual Neural Machine Translation. arXiv preprint arXiv:1809.04686, pp. 1-8, 2018.
Faruqui et al., "Improving Vector Space Word Representations using Multilingual Correlation," In Proceedings of the 14th Conference of the European Chapter of the Association for Computational Linguistics, pp. 462-471, 2014.
Gouws et al., "Bilbowa: Fast Bilingual Distributed Representations without Word Alignments," Proceedings of the 32nd International Conference Machine Learning, Lille, France, pp. 1-9, 2015.
Gu et al., "Universal Neural Machine Translation for Extremely Low Resource Languages," arXiv preprint arXiv:1802.05368, pp. 1-9, 2018.
Moritz et al., "Multilingual Models for Compositional Distributed Semantics," arXiv preprint arXiv:1404.4641, pp. 1-11, 2014.
Howard et al., "Universal Language Model Fine-Tuning for Text Classification," arXiv preprint arXiv:1801.06146, pp. 1-12, 2018.
Johnson et al., "Google's Multilingual Neural Machine Translation System: Enabling Zero-Shot Translation," Transactions of the Association for Computational Linguistics, 5:339-351, 2017.
Klementiev et al., "Inducing Crosslingual Distributed Representations of Words," Proceedings of COL/NG 2012, pp. 1459-1474, 2012.
Kocisky et al., "Learning Bilingual Word Representations by Marginalizing Alignments," arXiv preprint arXiv:1405.0947, pp. 1-6, 2014.
Lample et al., "Crosslingual Language Model Pretraining," arXiv preprint arXiv:1901.07291, pp. 1-10, 2019.
Luong et al., "Bilingual Word Representations with Monolingual Quality in Mind," In Proceedings of the 1st Workshop on Vector Space Modeling for Natural Language Processing, pp. 151-159, 2015.
McCann et al., "Learned in Translation: Contextualized Word Vectors," In Advances in Neural Information Processing Systems, pp. 6294-6305, 2017.
McCann et al., The Natural Language Decathlon: Multitask Learning as Question Answering. arXiv preprint arXiv:1806.08730, pp. 1-23, 2018.
Mikolov et al., "Exploiting Similarities among Languages for Machine Translation," arXiv preprint arXiv:1309.4168, pp. 1-10, 2013a.
Mikolov et al., "Distributed Representations of Words and Phrases and their Compositionality," In Advances in Neural Information Processing Systems, pp. 3111-3119, 2013b.

Neubig et al., "Rapid Adaptation of Neural Machine Translation to New Languages," arXiv preprint arXiv:1808.04189, pp. 1-6, 2018.
Pennington et al., "GloVe: Global Vectors for Word Representation," In Proceedings of the 2014 Conference on Empirical Methods in Natural Language Processing (EMNLP), pp. 1532-1543 2014.
Peters et al., "Deep Contextualized Word Representations," arXiv preprint arXiv:1802.05365, pp. 1-15, 2018.
Radford et al., "Improving Language Understanding by Generative Pre-training," URL https://s3-us-west-2.amazonaws.com/openai-assets/researchcovers/languageunsupervised/language understanding paper.pdf, pp. 1-12, 2018.
Rajpurkar et al., "SQuAD: 100,000+ Questions for Machine Comprehension of Text," arXiv preprint arXiv:1606.05250, pp. 1-10, 2016.
Ruder, "An Overview of Multi-task Learning in Deep Neural Networks," arXiv preprint arXiv: 1706.05098.
See et al., "Get to the Point: Summarization with Pointer-Generator Networks," In Proceedings of the 55th Annual Meeting of the Association for Computational Linguistics (vol. 1: Long Papers), vol. 1, pp. 1073-1083, 2017.
Sennrich et al., "Edinburgh Neural Machine Translation Systems for WMT 16," . arXiv preprint arXiv:1606.02891, pp. 1-6, 2016.
Seo et al., "Bidirectional Attention Flow for Machine Comprehension," In International Conference on Learning Representations, pp. 1-13, 2017.
Socher et al., "Recursive Deep Models for Semantic Compositionality over a Sentiment Treebank," In Proceedings of the 2013 Conference on Empirical Methods in Natural Language Processing, pp. 1631-1642, 2013.
Vaswani et al., "Attention is All You Need," 31st Converence on Neural Information Processing Systems (NIPS 2017), Long Beach, CA, USA, pp. 1-11, 2017.
Wang et al., "GLUE: A Multi-Task Benchmark and Analysis Platform for Natural Language Understanding," arXiv preprint arXiv:1804.07461, pp. 1-14, 2018.
Williams et al., "A Broad-Coverage Challenge Corpus for Sentence Understanding through Inference,". arXiv preprint arXiv:1704.05426, pp. 1-10, 2017.
Yu et al., "QANet: Combining Local Convolution with Global Self-Attention for Reading Comprehension," arXiv preprint arXiv:1804.09541, pp. 1-16, 2018.
Zou et al., "Bilingual Word Embeddings for Phrase-Based Machine Translation," In Proceedings of the 2013 Conference on Empirical Methods in Natural Language Processing, pp. 1393-1398, 2013.
J. Rao, N. Daftary, A. Desai and R. Koshy, "Algorithm for using NLP with extremely small text datasets," 2018 4th International Conference on Applied and Theoretical Computing and Communication Technology (iCATccT), Mangalore, India, 2018, pp. 1-6, doi: 10.1109/iCATccT44854.2018.9001929. (Year: 2018).
J. Skryzalin, H. Link, J. Wendt, R. Field and S. N. Richter, "Efficient Transfer Learning for Neural Network Language Models," 2018 IEEE/ACM International Conference on Advances in Social Networks Analysis and Mining (ASONAM), Barcelona, 2018, pp. 897-902, doi: 10.1109/ASONAM.2018.8508304. (Year: 2018).
J. Linden, X. Wang, S. Forsstrom and T. Zhang, "Bilingual Auto-Categorization Comparison ofTwo LSTM Text Classifiers," 2019 8th International Congress on Advanced Applied Informatics (IIAI-AAI), Toyama, Japan, 2019, pp. 599-604, doi: 10.1109/IIAI-AAI.2019.00127. (Year: 2019).

\* cited by examiner

Training Data Options for Two-input NLP Modules

Monolingual

Input Text Strings

| A | B |
|---|---|
| Language 1 | Language 1 |

*FIG. 2A*

Using One Regularization Language

Input Text Strings

| A | B |
|---|---|
| Language 1 | Language 1 |
| Language 1 | Language 2 |
| Language 2 | Language 1 |
| Language 2 | Language 2 |

*FIG. 2B*

Using Two Regularization Languages

Input Text Strings

| A | B |
|---|---|
| Language 1 | Language 1 |
| Language 1 | Language 2 |
| Language 1 | Language 3 |
| Language 2 | Language 1 |
| Language 3 | Language 1 |
| Language 2 | Language 2 |
| Language 3 | Language 3 |
| Language 2 | Language 3 |
| Language 3 | Language 2 |

*FIG. 2C*

FIG. 5 regularizer

| target | ar | bg | de | el | en | hi | fr | es | ru | sw | tr | ur | vi | zh |
|---|---|---|---|---|---|---|---|---|---|---|---|---|---|---|
| ar | 51.8 | +1.3 | +1.4 | +0.5 | +0.3 | +1.3 | +0.2 | +1.7 | +1.3 | +0.9 | +0.7 | 0.0 | +0.5 | +1.2 |
| bg | +0.5 | 54.4 | +0.5 | -0.9 | +1.5 | -0.6 | 0.0 | +0.1 | +1.7 | -0.1 | -0.2 | -0.7 | +0.6 | +0.4 |
| de | +1.5 | +0.9 | 55.8 | +0.6 | +2.0 | +1.1 | +1.2 | +1.8 | +0.8 | +0.5 | +1.0 | -0.5 | +1.4 | +1.1 |
| el | +3.2 | +2.7 | +3.3 | 51.8 | +2.2 | +3.2 | +2.4 | +2.9 | +3.5 | +2.7 | +1.4 | +2.0 | +1.3 | +1.9 |
| en | +0.8 | +1.3 | +2.0 | -1.1 | 59.1 | -0.4 | +0.6 | +0.1 | +0.9 | -0.2 | +0.1 | -1.1 | -0.9 | 0.0 |
| hi | +2.4 | +2.0 | +1.0 | +1.5 | +1.9 | 51.8 | +0.4 | +1.3 | +1.5 | +0.5 | +1.5 | +1.3 | +0.9 | +1.1 |

FIG. 5 regularizer

| target | ar | bg | de | el | en | es | fr | hi | ru | sw | tr | ur | vi | zh |
|---|---|---|---|---|---|---|---|---|---|---|---|---|---|---|
| ar | 72.0 | +2.1 | +0.7 | +0.8 | +1.9 | +1.3 | +1.9 | +0.7 | +1.3 | -0.6 | +0.9 | -2.2 | +1.5 | +2.0 |
| bg | +1.4 | 75.3 | +2.0 | +1.6 | +2.3 | +2.9 | +1.9 | +1.1 | +2.5 | +0.8 | +2.0 | -1.4 | +1.5 | +1.7 |
| de | +0.2 | +1.1 | 77.9 | +0.3 | +1.2 | +1.4 | +1.5 | -0.5 | +1.0 | +0.1 | +0.1 | -2.9 | +0.4 | +1.3 |
| el | +1.7 | +2.4 | +2.1 | 74.7 | +1.8 | +2.3 | +1.7 | +1.2 | +1.8 | +1.0 | +0.7 | -2.4 | +1.9 | +2.2 |
| en | +0.7 | +0.7 | +1.2 | +0.1 | 82.3 | +1.2 | +1.4 | -0.2 | +0.9 | -0.9 | +0.2 | -3.5 | +0.4 | 0.0 |
| es | +0.4 | +1.2 | +0.4 | -0.4 | +0.7 | 78.5 | +1.6 | +0.1 | +1.0 | -0.3 | +0.6 | -3.2 | +0.6 | +1.0 |
| fr | +1.0 | +1.7 | +1.8 | +0.8 | +0.8 | +1.6 | 78.0 | -0.3 | +1.6 | -0.1 | +0.5 | -3.5 | +0.8 | +1.0 |
| hi | +2.0 | +2.4 | +3.3 | +2.3 | +2.2 | +1.8 | +2.5 | 67.3 | +3.0 | +0.6 | +2.6 | +0.4 | +2.1 | +3.1 |
| ru | +1.4 | +1.3 | +1.1 | +0.9 | +1.6 | +1.8 | +1.7 | +1.6 | 73.9 | +0.4 | +0.7 | -2.0 | +0.7 | +1.8 |
| sw | +1.8 | +1.8 | +2.2 | +1.1 | +1.8 | +1.9 | +2.1 | +0.2 | +2.0 | 66.9 | 0.0 | -0.7 | +1.9 | +1.3 |
| tr | +0.3 | +0.7 | +1.1 | +0.1 | +0.9 | +0.9 | +0.3 | +0.2 | +1.1 | +0.2 | 73.6 | -2.1 | +0.3 | +1.4 |
| ur | +1.9 | +2.0 | +1.8 | +1.5 | +2.1 | +2.5 | +2.2 | +2.1 | +1.9 | +1.1 | +1.5 | 62.4 | 0.0 | +2.4 |
| vi | 0.0 | +0.4 | +0.2 | 0.0 | +0.3 | +0.6 | +0.4 | -0.6 | +0.2 | -0.9 | 0.0 | 0.0 | 74.5 | +0.4 |
| zh | +0.2 | +0.4 | +1.1 | +0.4 | +0.4 | +1.3 | +0.7 | +0.1 | +0.6 | -0.6 | +0.9 | -1.6 | +0.6 | 74.9 |

FIG. 6

| Lang. | BERT$_{ML}$ | Greedy XLR | $+\Delta$ |
|---|---|---|---|
| ar | 71.4 | 75.0 | 3.6 |
| bg | 75.9 | 79.1 | 3.2 |
| de | 76.1 | 78.7 | 2.6 |
| el | 74.8 | 78.4 | 3.6 |
| en | 81.5 | 83.4 | 1.9 |
| es | 79.0 | 80.4 | 1.4 |
| fr | 78.3 | 78.8 | 0.5 |
| hi | 67.2 | 71.9 | 4.7 |
| ru | 74.6 | 76.7 | 2.1 |
| sw | 65.2 | 70.0 | 4.8 |
| tr | 72.2 | 75.1 | 2.9 |
| ur | 63.0 | 65.9 | 2.9 |
| vi | 72.6 | 76.1 | 3.5 |
| zh | 74.6 | 76.0 | 1.4 |

*FIG. 9*

| Ques. | Context | EM | nF1 |
|---|---|---|---|
| en | en | 81.7 | 88.5 |
| en,de | en,de | -0.4 | 0.0 |
| en,ru | en,ru | -0.5 | +0.1 |
| en,es | en,es | -0.3 | +0.3 |
| en,fr | en,fr | +0.1 | +0.6 |
| en | en,de | 0.0 | +0.8 |
| en | en,ru | +0.2 | +0.7 |
| en | en,es | +0.4 | +0.8 |
| en | en,fr | +0.5 | +1.0 |

*FIG. 10*

CROSS-LINGUAL REGULARIZATION FOR MULTILINGUAL GENERALIZATION

RELATED APPLICATIONS

The present application is a continuation of and claims priority to co-pending and commonly-owned U.S. patent application Ser. No. 16/399,429, filed on Apr. 30, 2019, which in turn claims priority to U.S. Provisional Patent Application No. 62/813,691, filed Mar. 4, 2019, entitled "Cross-Lingual Regularization for Multilingual Generalization," both of which are hereby incorporated by reference in their entirety.

TECHNICAL FIELD

The present disclosure relates generally to training and use of machine learning systems for natural language processing and more specifically to cross-lingual regularization for multilingual generalization.

BACKGROUND

Deep learning-based approaches for natural language Processing (NLP) tasks often achieve state-of-the-art results but require large amounts of annotated data. These tasks include question answering, machine translation, document summarization, database query generation, sentiment analysis, natural language inference, semantic role labeling, relation extraction, goal-oriented dialogue, and pronoun resolution, and/or the like. For many of these tasks, data can be plentiful in high-resource languages, such as English, French, Spanish, German, Russian, Japanese, Chinese, and/or the like, where numerous training datasets and examples are readily available. However, for low-resource languages, such as Greek, Bulgarian, Turkish, Arabic, Vietnamese, Korean, Hindi, Swahili, Urdu, and/or the like, the collection and proliferation of data is limited. This poses a challenge for NLP systems because systems trained on one dataset do not always transfer well to others.

Accordingly, it would be advantageous to have systems and methods for training NLP systems that can handle low-resource languages.

BRIEF DESCRIPTION OF THE DRAWINGS

FIGS. 2A-2C are simplified diagrams of input text string language selections for use during training according to some embodiments.

FIG. 5 is a simplified diagram of the effects of different types of NLP module initialization during regularization training according to some embodiments.

FIG. 6 is a simplified diagram of the usefulness of various languages as regularization languages for various target languages according to some embodiments.

FIGS. 8 and 9 are simplified diagrams showing the improvement of cross-lingual regularization in comparison to multi-lingual training according to some embodiments.

FIG. 10 is a simplified diagram of the impact of translating different input text strings when using regularization training according to some embodiments.

In the figures, elements having the same designations have the same or similar functions.

DETAILED DESCRIPTION

To address ways to improve NLP systems that support low-resource languages, a regularization approach may be used that uses training data from another language to improve the performance of the NLP systems through transfer learning. Multilingual regularization, is a technique that can be used with both generatively pretrained models and word embeddings, without needing to explicitly further align the embeddings. The approach is easily used in conjunction with numerous existing approaches to NLP. Additionally, the approach seamlessly scales for many languages and improves performance on both high- and low-resource languages tested including English, French, Spanish, German, Greek, Bulgarian, Russian, Turkish, Arabic, Vietnamese, Chinese, Japanese, Korean, Hindi, Swahili, Urdu, and/or the like.

Figure 1:
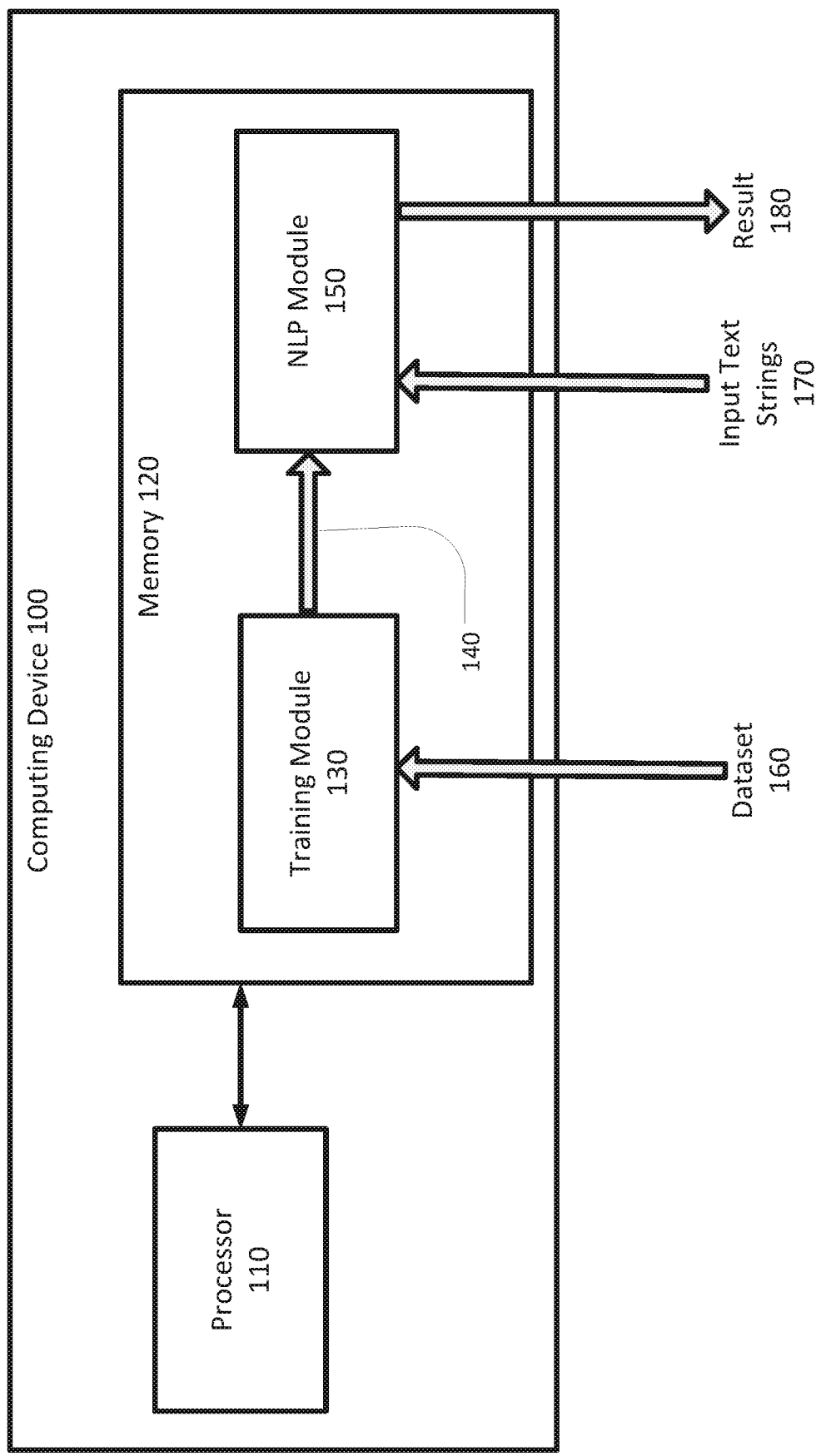
FIG. 1 is a simplified diagram of a computing device according to some embodiments.

FIG. 1 is a simplified diagram of a computing device 100 according to some embodiments. As shown in FIG. 1, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs), tensor processing units (TPUs), and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

As shown, memory 120 includes a training module 130 and an NLP module 150. Training module may be used to access a training dataset 160 in a first language and generate a multilingual regularization dataset 140 by translating one or more entries from training dataset 160 into one or more second or regularizing languages. Entries from training dataset 160 and the translated entries are then combined to form the entries of regularization dataset 140. Training module 130 may then use regularization dataset 140 to train NLP module 150. In some examples, training dataset 160 may be stored locally (e.g., within memory 120 and/or within one or more other storage devices, such as disk drives, solid state drives, and/or the like of computing device 100) and/or within one or more storage devices located remotely to computing device 100 (e.g. one or more distributed and/or cloud storage devices) coupled to computing device 100 via a network. In some examples, the network may include one or more local area networks (e.g., an ethernet), one or more wide area networks (e.g., the internet), and/or the like.

NLP module 150 is trained using regularization dataset 140. Once trained, NLP module 150 may be used to perform a NLP task, such as one or more of question answering, machine translation, document summarization, database query generation, sentiment analysis, natural language inference, semantic role labeling, relation extraction, goal-oriented dialogue, pronoun resolution, and/or the like. In some examples, NLP module 150 may be used to receive a natural language input having one or more input text strings 170 and generate a result 180. In some examples, NLP module 150 may include a machine learning structure, such as one or more neural networks. Examples of neural structures for NLP processing are described in further detail in commonly-owned U.S. patent application Ser. No. 16/006,691, entitled "Multitask Learning as Question Answering" and filed Jun. 12, 2018, which is incorporated by reference herein.

In some examples, memory 120 may include non-transitory, tangible, machine readable media that includes executable code that when run by one or more processors (e.g., processor 110) may cause the one or more processors to perform the methods described in further detail herein. In some examples, training module 130 and/or NLP module 150 may be implemented using hardware, software, and/or a combination of hardware and software.

As discussed above and further emphasized here, FIG. 1 is merely an example which should not unduly limit the scope of the claims. One of ordinary skill in the art would recognize many variations, alternatives, and modifications. According to some embodiments, training module 130 and/ or NLP module 150 may be located in separate computing devices. In some examples, each of the separate computing devices may be consistent with computing device 100.

FIGS. 2A-2C are simplified diagrams of input text string language selections for use during training according to some embodiments. As shown in FIGS. 2A-2C, the training data options are shown for an NLP module (e.g., NLP module 150) that receives two input text strings A and B, which in some examples correspond to input text strings 170. Examples of NLP modules that receive two input text strings include natural language inference, where the two input text strings include two sentences—a premise and a hypothesis. The goal of the natural language inference NLP module is to determine whether the hypothesis logically entails from the premise. FIG. 2A demonstrates the monolingual approach where the training data set is designed to train the NLP module to process input text strings in language 1. To support the monolingual approach, the training dataset includes only entries where both input text string A and input text string B are in language 1.

FIG. 2B demonstrates the approach when a single regularization language (language 2) is used to help train the NLP module. As FIG. 2B shows, the training dataset still includes the entries where both input text string A and input text string B are in language 1. However, the training dataset is further augmented to form a regularization dataset (e.g., regularization dataset 140) that includes entries where input text string A is in language 1 and input text string B is in language 2, input text string A is in language 2 and input text string B is in language 1, and input text string A is in language 2 and input text string B is in language 2. In some examples, the entries that include one or more of input text string A or input text string B may be generated by manually and/or automatically (e.g., using an NLP language translation module) either input text string A, input text string B, or both input text strings A and B from entries in the original language 1 training dataset to language 2. In some examples, when the goal of the NLP module is just to support language 1, the entries where both input text string A and input text string B are translated to language 2 may be omitted from the regularization training dataset (e.g., never generated).

FIG. 2C demonstrates the approach when two regularization languages (languages 2 and 3) are used to help train the NLP module. As FIG. 2C shows, the training dataset includes entries where one or both of input text string A and input text string B are in any of the three languages 1, 2, or 3. This leads to up to nine (3*3) possible language combinations in the regularization training dataset. In some examples, as with the single regularization language approach of FIG. 2B, the two regularization language approach may omit entries where both of input text string A and input text string B are translated to either language 2 or language 3.

As discussed above and further emphasized below, FIGS. 2A-2C are merely examples which should not unduly limit the scope of the claims. One of ordinary skill in the art would recognize many variations, alternatives, and modifications. According to some embodiments, three or more regularization languages may be used where one or both of input text string A and input text string B may be translated to any the regularization languages. For example, if three regularization languages are used then there are 16 (4*4) possible language combinations in the entries in the regularization dataset or alternatively 7 (4+3) possible languages combinations in the entries in the regularization dataset when at least one of input text string A and input text string B are kept in language 1. In addition, four or more regularization languages may be used as is described in further detail below.

According to some embodiments, when the NLP module uses only a single input text string (e.g., just input text string A), the regularization dataset includes the original entries in language 1, but also entries in any of the regularization languages. Examples of NLP tasks that use only a single input text string include document summarization, database query generation, sentiment analysis, semantic role labeling, relation extraction, goal-oriented dialogue, pronoun resolution, and/or the like.

According to some embodiments, when the training entries for the NLP module include ground truth answers (e.g., result 180) that are also text strings, the ground truth text string may also be translated to one of the regularization language. Examples of NLP tasks that include ground truth results that are also text strings include question answering, database query generation, and/or the like. In some examples, it may be beneficial to limit the language of the ground truth results so that are consistent with the language of one of the input text strings. In some examples, with question-answering where the input text strings are the context and the question, the language of the ground truth answer may be limited to the language of the context (e.g., kept as language 1 when the context is not translated or translated to the same regularization language as the context). In some examples, with database query generation, the language of the ground truth database query may be in the same language as the single input text string.

According to some embodiments, the same approaches may be adapted when there are three or more input text strings. As an example, when there are three input text strings and one regularization language there are up to 8 (2^3) possible language combinations in the entries of the regularization dataset. As another example, when there are four input text strings and three regularization languages there are up to 81 (3^4) possible language combinations in the entries of the regularization dataset.

Figure 3:
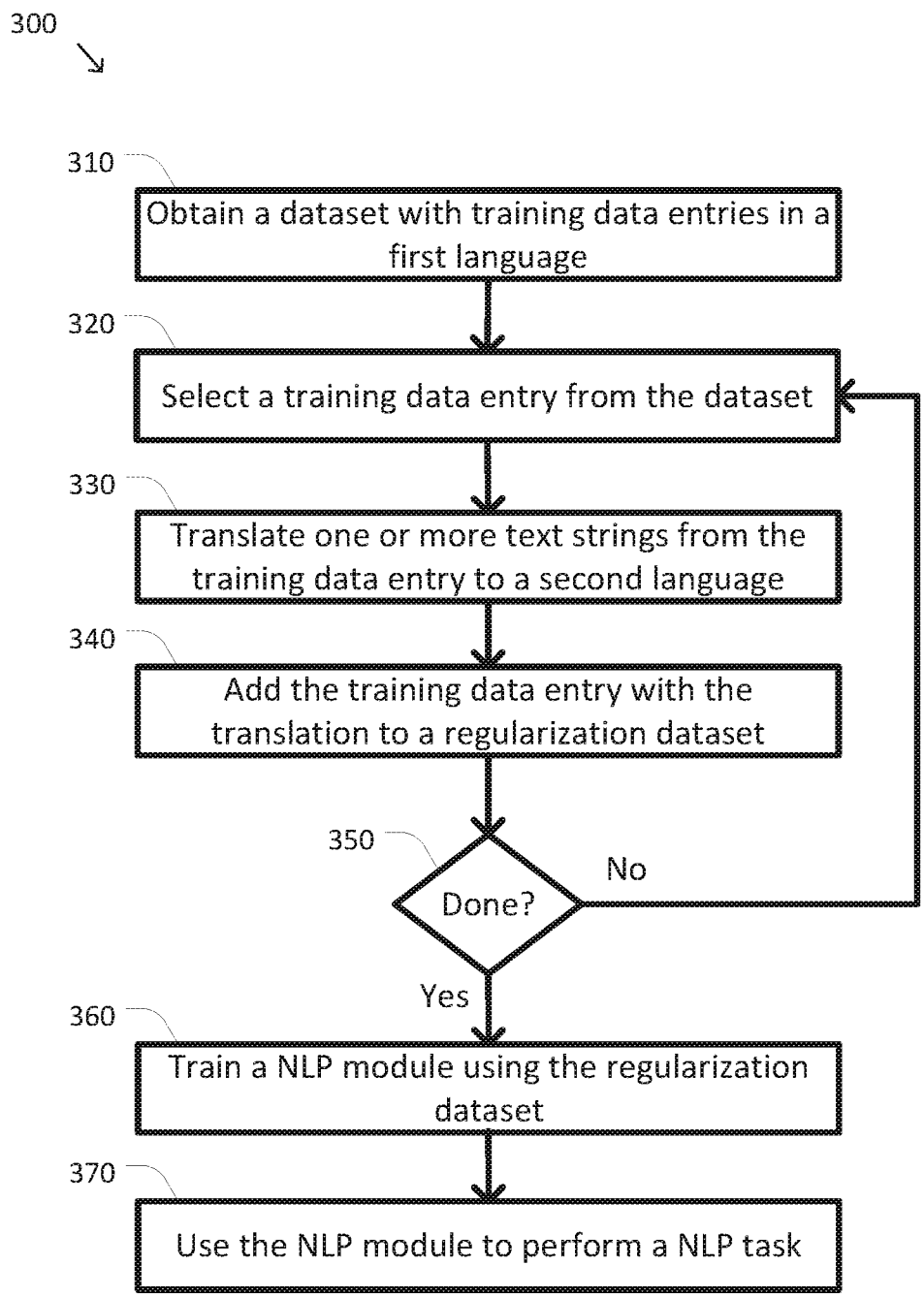
FIG. 3 is a simplified diagram of a method of training and using a natural language processing module using regularization according to some embodiments.

FIG. 3 is a simplified diagram of a method 300 of training and using a NLP module according to some embodiments. One or more of the processes 310-370 of method 300 may be implemented, at least in part, in the form of executable code stored on non-transitory, tangible, machine-readable media that when run by one or more processors (e.g., processor 110) may cause the one or more processors to perform one or more of the processes 310-370. In some embodiments, method 300 may correspond to the methods used by training module 130 and/or NLP module 150 to prepare training data, train the NLP module, and/or use the NLP module to perform an NLP task, such as one or more of question answering, document summarization, database query generation, sentiment analysis, natural language inference, semantic role labeling, relation extraction, goal-oriented dialogue, pronoun resolution, and/or the like.

At a process 310, a dataset with training data entries in a first language is obtained. In some examples, the dataset may include a plurality of training data entries in the first language. In some examples, each of the training data entries may include one or more input text strings in the first language (e.g., consistent with input text strings 170) and a ground truth result (e.g., consistent with result 180). In some examples, the dataset may be consistent with training dataset 160. A copy of the training dataset then becomes a regularization dataset. In some examples, the dataset may be obtained from a database, a data store, and/or the like.

At a process 320, a training data entry (e.g., a training data sample) from the dataset is selected. In some examples, the training data entry may be selected randomly. In some examples, the selection of training data entries may be tracked so that no training data entry is selected and translated (as discussed below) so that a duplicate training data entry of a previously generated training data entry is not created.

At a process 330, one or more of the text strings from the selected training data entry is translated to a second language. In some examples, the one or more of the text strings may be randomly selected from any of the one more input text strings and/or the ground truth text string (where applicable). In some examples, the second language may be selected from any of one or more regularization languages used during method 300. In some examples, when two or more of the one or more input text strings and/or the ground truth text string are translated, they may be translated to a same or different second languages from the one or more regularization languages. In some examples, the translating during process 330 may generate a training data entry with combinations of languages consistent with those discussed with respect to FIGS. 2A-2C. In some examples, one or more of the one or more second languages may be a high-resource language, such as English, French, Spanish, German, Russian, Japanese, Chinese, and/or the like.

At a process 340, the training data entry as translated by process 330 is added to the regularization dataset. Thus, the regularization dataset includes both the training data entries from the dataset obtained during process 310 as well as training data entries with one or more translated text strings.

At a process 350, it is determined whether additional training data entries should be selected, translated, and added to the regularization dataset. In some examples, processes 320-350 may be repeated until a configurable percentage (e.g., 50 to 100 percent) of the training data entries of the dataset obtained during process 310 are selected and translated. In some examples, processes 320-350 may be repeated until a size of the regularization dataset (in terms of a number of training data entries) is N times larger than a size of the dataset obtained during process 310. In some examples, N may be selected based on one or more of a configurable percentage of training data entries from the dataset obtained during process 310, a number of text strings in each training data entry, and/or a number of regularization languages used to translate the text strings during process 330. When further training data entries are to be selected and translated, method 300 returns to process 320 to select another training data entry from the dataset obtained during process 310. When method 300 is done selecting and translating training data entries, training of a NLP module (e.g., NLP module 150) begins with a process 360.

At the process 360, the NLP module is trained using the regularization dataset. In some examples, the NLP module may be trained using supervised learning, such as by using back propagation, stochastic gradient descent techniques, and/or the like.

At a process 370, the NLP module is used to perform an NLP task. In some examples, the NLP task may be performed by presenting a natural language input including one or more input text strings (e.g., the one more input text strings 170) to the NLP module and having the NLP module generate a result (e.g., result 180.) In some examples, the NLP module may perform the NLP task by receiving the input text strings at an input layer to a neural network, forward propagating the natural language input through a multi-layer neural network, and generating the result at an output layer. In some examples, the NLP task may include one or more of question answering, document summarization, database query generation, sentiment analysis, natural language inference, semantic role labeling, relation extraction, goal-oriented dialogue, pronoun resolution, and/or the like.

Figure 4:
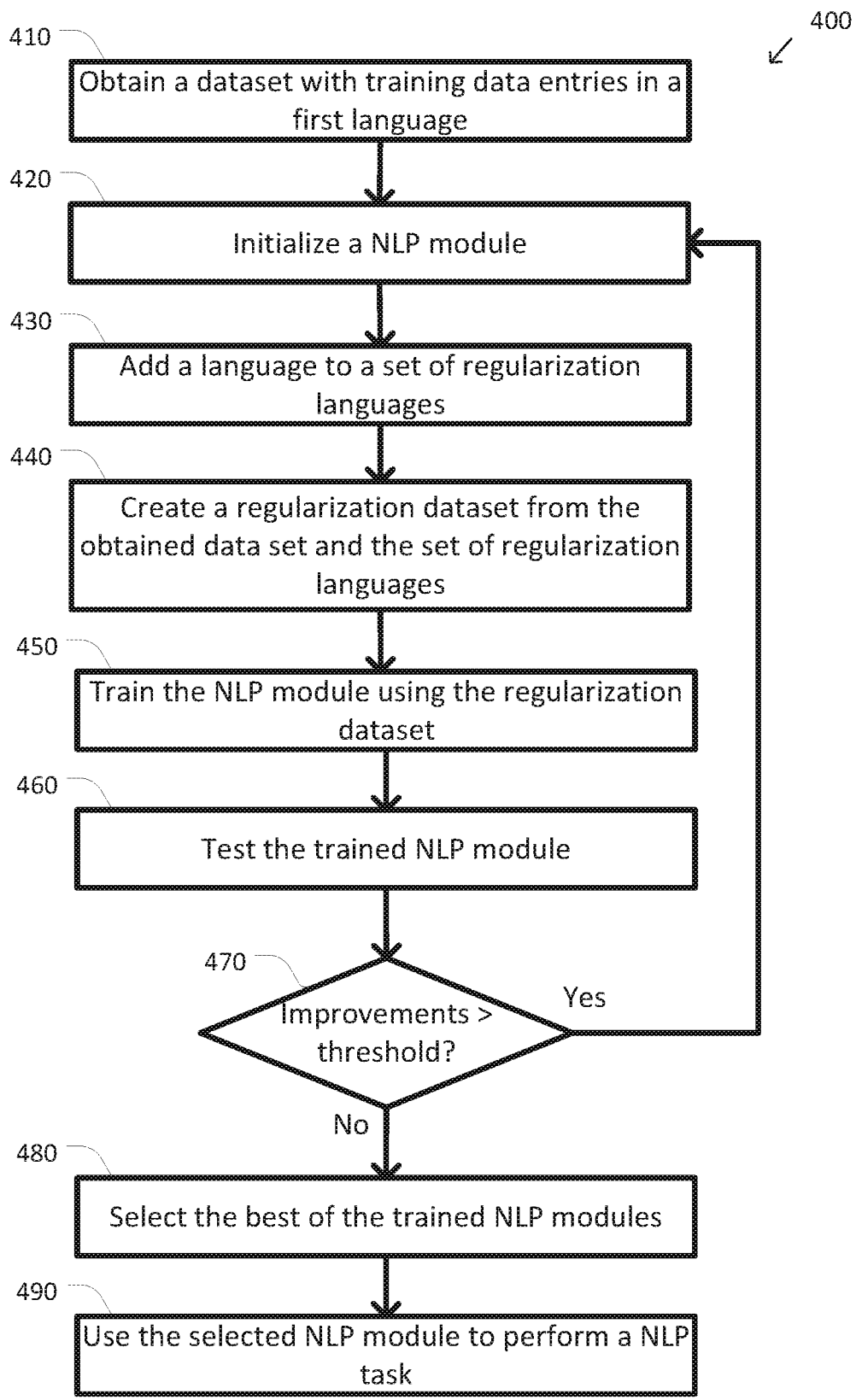
FIG. 4 is a simplified diagram of a method of training and using a natural language processing module using multi-language regularization according to some embodiments.

Method 300 of FIG. 3 describes the case when the regularization languages (e.g., the second languages) are selected prior to training. However, because multiple languages may be used as regularization languages, it may be useful to systematically add regularization languages to further improve the training of the NLP module. FIG. 4 is a simplified diagram of a method 400 of training and using a natural language processing module using multi-language regularization according to some embodiments. One or more of the processes 410-490 of method 400 may be implemented, at least in part, in the form of executable code stored on non-transitory, tangible, machine-readable media that when run by one or more processors (e.g., processor 110) may cause the one or more processors to perform one or more of the processes 410-490. In some embodiments, similar to method 300, method 400 may correspond to the methods used by training module 130 and/or NLP module 150 to prepare training data, train the NLP module, and/or use the NLP module to perform an NLP task.

At a process 410, a dataset with training data entries in a first language is obtained. In some examples, process 410 may be substantially the same as process 310.

At a process 420, a NLP module is initialized. Before training can begin, the weights, biases, and/or other trainable parameters of the NLP module are initialized. In some examples, the NLP module may be initialized randomly. In some examples, the random initialization of the NLP module may begin with a same random number seed each time process 420 is performed. In some examples, the NLP module may be initialized based on previous training (e.g., during a previous pass through processes 420-470).

According to some embodiments, random initialization of the NLP module is preferred over pretraining of the NLP modules as shown in FIG. 5, which is a simplified diagram of the effects of different types of NLP module initialization during regularization training according to some embodiments. As shown in FIG. 5, the effectiveness of various regularization languages (Arabic/ar, Bulgarian/br, German/de, Greek/el, English/en, Spanish/es, French/fr, Hindi/hi, Russian/ru, Swahili/sw, Turkish/tr, Urdu/ur, Vietnamese/vi, and Chinese/zh) for various target (first) languages when the NLP module is trained from a random initialization is better than when the NLP module has a pre-trained initialization. Each of the entries in FIG. 5 shows the relative improvement from a random initialization relative to a pretrained initialization.

Referring back to FIG. 4, at a process 430, a language is added to a set of regularization languages. In some examples, the language to add may be selected from a high-resource language, such as English, French, Spanish, German, Russian, Japanese, Chinese, and/or the like. In some examples, the language to add may be selected from a set of languages known to be good regularization languages and/or good regularization languages for the first language. In some examples, the language to add may be selected in order based on how well the language to add is likely to aid in the training of the NLP module relative to the languages available as regularization languages. A language may only be added to the set of regularization languages once during the performance of method 400. In some examples, the usefulness of a language as a regularization language for the first language may be determined based on the training of other NLP modules (e.g., that perform a similar and/or related NLP task and/or using similar and/or related training datasets).

FIG. 6 is a simplified diagram of the usefulness of various languages as regularization languages for various target languages according to some embodiments. FIG. 6 shows the relative improvement between monolingual training (e.g., no regularization language) for various target languages and training with various regularization languages for the BERT$_{ML}$ NLP model against the Cross-lingual Natural Language Inference (XNLI) dataset. The BERT$_{ML}$ NLP model is described in further detail in Devlin, et al., "Pre-training of Deep Bidirectional Transformers for Language Understanding," 2018, available at https://arxiv.org/abs/1810.04805, which is incorporated by reference herein The XNLI dataset is described in further detail Conneau, et al., "XNLI: Evaluating Cross-lingual Sentence Representations, 2018, available at https://arxiv.org/abs/1809.05053, which is incorporated by reference herein As shown in FIG. 6, each row corresponds to a target language (e.g., the first language) for the NLP module and the columns correspond to each of the regularization languages. Diagonal entries correspond to the testing scores for the target language using monolingual training without a regularization language. Entries off the diagonal show the improvement or non-improvement when the corresponding regularization language is used during training of the NLP module for the target language. As FIG. 6, shows, each of the target languages has at least one regularization language that may be used to improve the performance of the NLP module. For example, when Hindi (hi) is the target language, monolingual training results in a testing score of 67.3 and use of German (de) as the regularization language (when translating only one of the premise or the hypothesis, but not both) improves the testing score by 3.3 to 70.6. Hindi regularized by German represents the strongest improvement, whereas Vietnamese regularized by Spanish represents the weakest improvement of 0.6.

FIG. 6 further shows that lower-resource languages tend to be less effective as regularization languages. For example, the abundance of negative (e.g., reductions in testing score) in the Urdu (ur) column reveals that Urdu tends to be a poor regularization language. In the aggregate, using Urdu as the regularization language hurts testing score by an average of 1.8. However, Urdu benefits strongly from using a regularization language.

Charts like FIG. 6 may be used to determine the order in which languages are selectively added to the set of regularization languages by selecting the regularization languages for the first language corresponding to the entries in the row for the first language from largest to smallest. In some examples, when a chart like FIG. 6 is not available or because different results may be obtained for different NLP modules and different training datasets, the order in which to add languages to the set of regularization languages are selected may be based on an average of the improvements from each of the columns of a language comparison chart, like that in FIG. 6.

Referring back to FIG. 4, at a process 440, a regularization dataset is created from the dataset obtained during process 410 and the set of regularization languages. In some examples, process 440 may be substantially similar to processes 310-350 of method 300.

At a process 450, the NLP module is trained using the regularization dataset. In some examples, process 450 may be substantially similar to process 360.

At a process 460, the NLP module is tested. In some examples, a configurable portion (e.g., 20-40 percent) of the training data entries in the dataset obtained during process 410 may be reserved for testing. The training data entries to be used for testing are randomly removed from the dataset and placed in a testing dataset before creating the regularization dataset during process 440. During process 460, the input text strings of each of the training data entries in the testing dataset is applied to the NLP module and a result is generated. The result is compared to the ground truth result in the corresponding training data entry and a testing score is determined based on an aggregation of the comparisons for each of the training data entries in the testing dataset.

At a process 470, it is determined whether the improvements in the testing score for the NLP module after training with the additional language added to the set of regularization languages are greater than threshold better than the testing score for the NLP module without the additional language added to the set of regularization languages. In some examples, when this is the first pass through processes 420-470, the testing score for the NLP module without the additional language corresponds to the NLP module trained using only monolingual training data entries. In some examples, the threshold may be negative allowing some decrease in the testing score of the NLP module while still allowing additional languages to be added to the set of regularization languages. In some examples, when the improvements in the testing score for the current pass through processes 420-470 is negative, the improvements may be determined relative to the last testing score that was a positive improvement on a previous testing score so that repeated negative improvements above the threshold may eventually end the repetition of processes 420-470. When the improvements are above the threshold, processes 420-470 are repeated with another language being added to the set of regularization languages. When the improvements are below the threshold or when no more languages are available to add, method 400 continues with a process 480.

At the process 480, the best of the trained NLP modules is selected. Using the testing scores determined during process 460, the trained NLP module with the highest testing score is selected for use to perform NLP tasks.

At a process 490, the selected NLP module is used to perform a NLP task. In some examples, process 490 is substantially similar to process 370.

As discussed above and further emphasized below, FIGS. 3 and 4 are merely examples which should not unduly limit the scope of the claims. One of ordinary skill in the art would recognize many variations, alternatives, and modifications. According to some embodiments, when the first language is a low-resource language, it may be advantageous to build the regularization dataset in reverse to the approach used during processes 320-350 and/or process 440. In some examples, a dataset for each of the regularization languages may be obtained and one or more and/or all of the input text strings and/or the result text string (where applicable) of the training data entries may be translated to the first language or to one of the other regularization languages with the resulting training data entries being added to the regularization dataset.

Figure 7A:
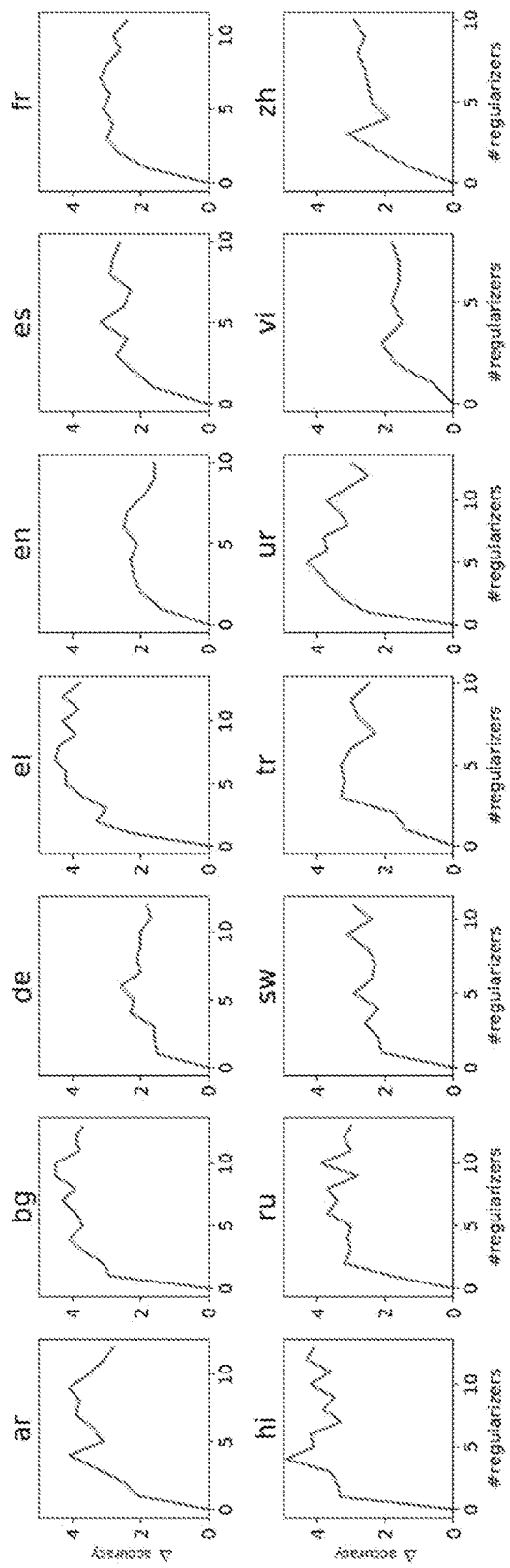
FIGS. 7A and 7B are simplified diagrams of the effects of adding additional regularizing language according to some embodiments.
Figure 7B:
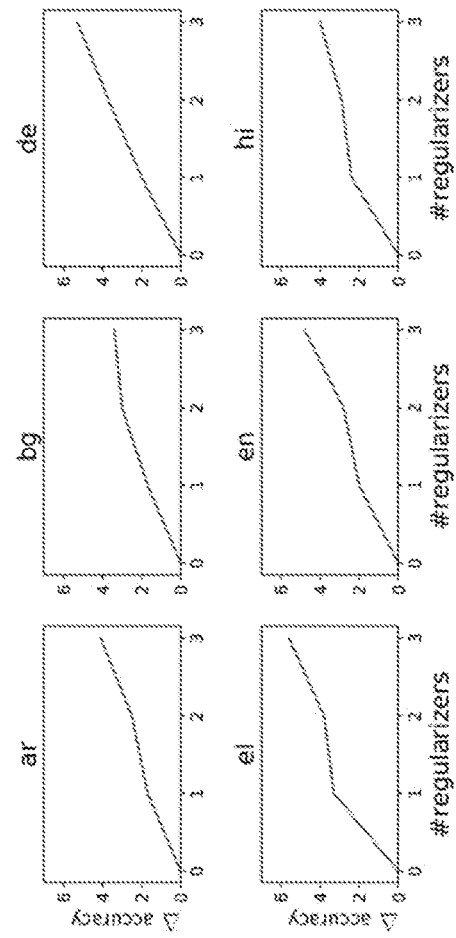

FIGS. 7A and 7B are simplified diagrams of the effects of adding additional regularizing language according to some embodiments. FIG. 7A shows plots of the testing score (e.g., as determined during process 460 of method 400) as additional regularization languages are added to the set of regularization languages. The choice of regularization language to add to the set of regularization languages during process 430 is the regularization language having the best improvement for the first/target language that was not already in the set of regularization languages according to the improvements shown in FIG. 7A. As FIG. 7A, further shows the addition of some regularization languages to the set of regularization languages results in a temporary decrease in testing score but continuing to add additional regularization languages often results in a better overall testing score even with the temporary decrease in testing score. This justifies the use of a negative threshold in process 470. In addition, use of the iterative approach of method 400 shows an improvement in testing score relative to use of a single regularization language with method 300.

FIG. 7B shows the impact of adding additional regularization languages in the training of a long short-term memory (LSTM) based NLP model. The LSTM-based NLP model uses the same tokenization embeddings used for the $BERT_{ML}$ model, passes the input text strings through a two-layer bi-directional LSTM (BiLSTM), projects the outputs from the final BiLSTM layer to a lower dimension, max-pools the results, and then passes that through a final three-class classification layer. Thus, FIG. 7B shows that using more than one regularizing language also improves testing scores for NLP models other than the $BERT_{ML}$ model.

Figure 8:
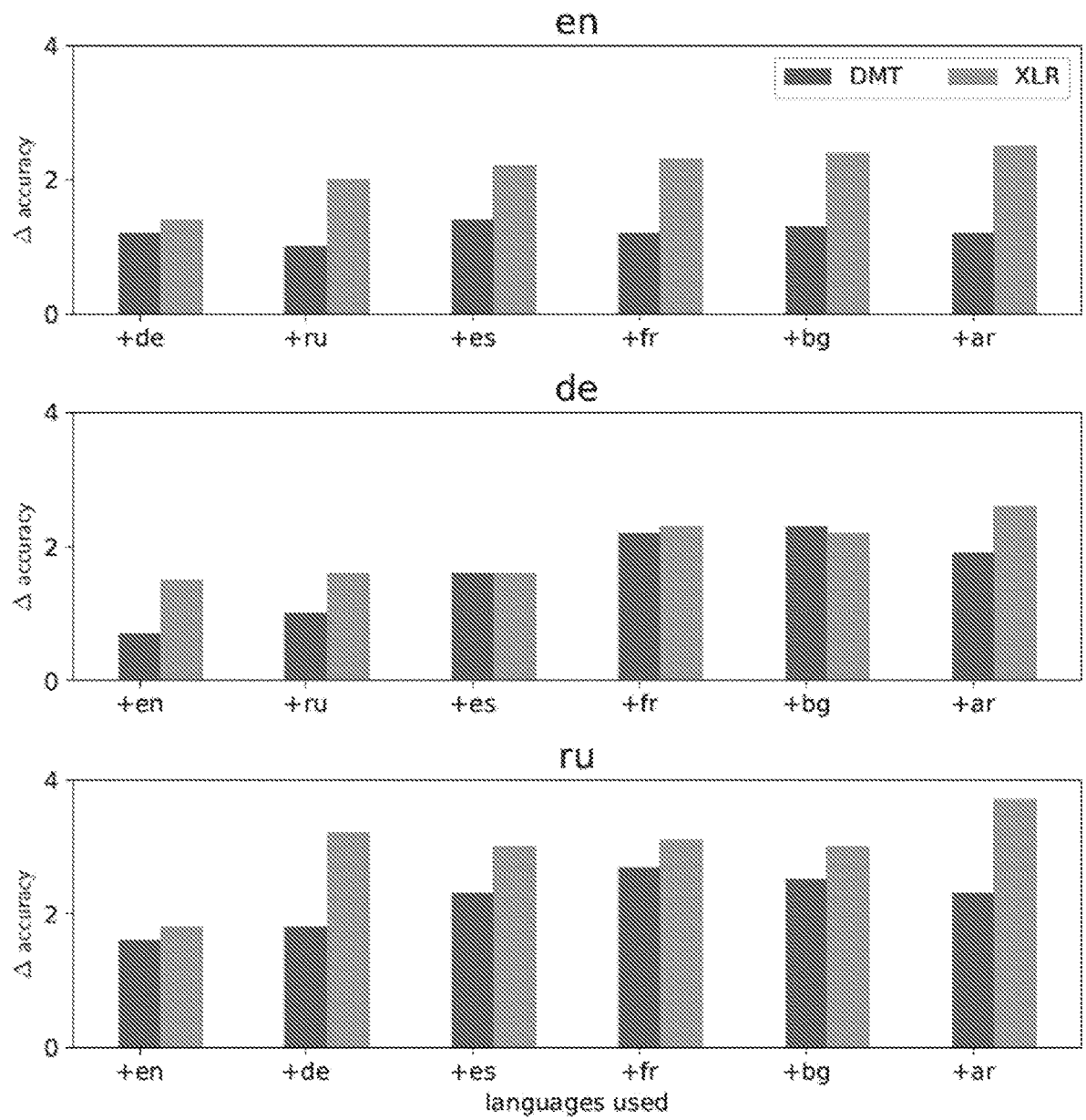

FIGS. 8 and 9 are simplified diagrams showing the improvement of cross-lingual regularization in comparison to multi-lingual training according to some embodiments. FIG. 8 shows the improvements in testing scores of both multilingual training using multilingual training datasets (left bars) and training using the regularization approach of method 300 (right bars) over monolingual training. As shown, both the multilingual and the regularization approaches of method 300 improve the testing scores for NLP models targeting English (en), German (de), and Russian (ru) using six other regularization languages, but the regularization approach of method 300 shows better improvements than the multilingual training approach. FIG. 9 shows the improvements in testing score of the regularization approach of method 400 (Greedy XLR) over the multilingual training for the $BERT_{ML}$ model from Devlin, et al. The bold entries represent state-of-the-art testing scores using method 400.

FIG. 10 is a simplified diagram of the impact of translating different input text strings when using regularization training according to some embodiments. FIG. 10 shows the improvements in both the EM and nF1 testing scores for a NLP model trained for question answering using the Stanford Question Answering Dataset (SQuAD). SQuAD is described in more detail in Rajpurkar, et al. "Squad: 100, 000+ Questions for Machine Comprehension Text," Proceedings of the 2016 Conference on Empirical Methods in Natural Language Processing (EMNLP), which is incorporated by reference herein FIG. 10 shows the changes in EM and nF1 testing scores for the NLP model targeting English where translations during process 330 are allowed to provide translations of both the question (Ques.) and context input text strings to the regularization languages shown (upper half of FIG. 10) and when only the context input text string is allowed to be translated (lower half of FIG. 10).

According to some embodiments, a method for training a natural language processing (NLP) deep learning module includes accessing a first dataset comprising a plurality of first training data entries having one or more input text string in a first language; initializing the deep learning module; adding a second language to a set of regularization languages; creating a plurality of second training data entries by: selecting training data entries from the first dataset and translating one or more of the one or more input text strings to a third language in the set of regularization languages; combining the plurality of first training data entries and the second training data entries to form a training dataset; training the deep learning module using the training dataset; testing the trained deep learning module; repeating the initializing, adding, creating, combining, training, and testing until a testing score for the trained deep learning module improves by less than a threshold amount; selecting the trained deep learning module with a highest testing score; and using the trained deep learning module with the highest testing score to perform a NLP task.

Some examples of computing devices, such as computing device 100 may include non-transitory, tangible, machine readable media that include executable code that when run by one or more processors (e.g., processor 110) may cause the one or more processors to perform the processes of methods 300 and/or 400. Some common forms of machine readable media that may include the processes of methods 300 and/or 400 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for training a natural language processing (NLP) deep learning module, the method comprising:
    obtaining a first dataset of training data in a first language;
    performing one or more training passes of:
        adding a new language to a set of regularization languages different from the first language,
        creating a second dataset of training data translated from the first dataset of training data corresponding to the set of regularization languages,
        training the deep learning module using the second dataset, and
        determining whether a performance improvement metric associated with the trained deep learning module is greater than a threshold; and
    selecting a trained deep learning module with a best performance improvement metric over the one or more training passes.

2. The method of claim 1, wherein the first dataset comprises a first training data entry, and the method further comprising: creating a second training data entry by starting with the first training data entry and substituting the at least one of the natural language input text strings in the first language with the translation of the at least one of the natural language input text strings in the second language.

3. The method of claim 1, further comprising copying a training data entry from the first dataset to the second dataset.

4. The method of claim 1, further comprising using the NLP deep learning module to perform an NLP task.

5. The method of claim 4, wherein NLP task includes one or more of question answering, document summarization, database query generation, sentiment analysis, natural language inference, semantic role labeling, relation extraction, goal-oriented dialogue, or pronoun resolution.

6. The method of claim 1, further comprising:
    translating at least one of the one or more natural language input text strings of a first training data entry from the first language to a third language;
    creating a third training data entry by starting with the first training data entry and substituting the at least one of the natural language input text strings in the first language with the translation of the at least one of the natural language input text strings in the third language; and
    adding the third training data entry to the second dataset.

7. The method of claim 1, further comprising repeatedly selecting additional trading data entries from the first dataset, translating one or more of the input text strings of the additional trading data entries to the second language, creating new training data entries from the additional trading data entries and the translations, and adding the new training data entries to the second dataset until a configurable number of new training data entries are added to the second dataset.

8. The method of claim 1, further comprising selecting the second language as a regularization language for the first language.

9. The method of claim 1, wherein the NLP deep learning module comprises a neural network.

10. The method of claim 1, further comprising:
    systematically adding a third language as a regularization language for the first language during training.

11. A system for training a natural language processing (NLP) deep learning module, the system comprising:
    a memory; and
    one or more processors;
    wherein the one or more processors are configured to:
        obtain a first dataset of training data in a first language;
        perform one or more training passes of:
            adding a new language to a set of regularization languages different from the first language,
            creating a second dataset of training data translated from the first dataset of training data corresponding to the set of regularization languages,
            training the deep learning module using the second dataset, and
            determining whether a performance improvement metric associated with the trained deep learning module is greater than a threshold; and
        select a trained deep learning module with a best performance improvement metric over the one or more training passes.

12. The system of claim 11, wherein the first dataset comprises a first training data entry, and the one or more processors are further configured to:
    create a second training data entry by starting with the first training data entry and substituting the at least one of the natural language input text strings in the first language with the translation of the at least one of the natural language input text strings in the second language.

13. The system of claim 11, wherein the one or more processors are further configured to copy a training data entry from the first dataset to the second dataset.

14. The system of claim 11, wherein the one or more processors are further configured to use the NLP deep learning module to perform an NLP task.

15. The system of claim 14, wherein NLP task includes one or more of question answering, document summarization, database query generation, sentiment analysis, natural language inference, semantic role labeling, relation extraction, goal-oriented dialogue, or pronoun resolution.

16. The system of claim 11, wherein the one or more processors are further configured to:
   translate at least one of the one or more natural language input text strings of a first training data entry from the first language to a third language;
   create a third training data entry by starting with the first training data entry and substituting the at least one of the natural language input text strings in the first language with the translation of the at least one of the natural language input text strings in the third language; and
   add the third training data entry to the second dataset.

17. The system of claim 11, wherein the one or more processors are further configured to repeatedly select additional trading data entries from the first dataset, translate one or more of the input text strings of the additional trading data entries to the second language, create new training data entries from the additional trading data entries and the translations, and add the new training data entries to the second dataset until a configurable number of new training data entries are added to the second dataset.

18. The system of claim 11, wherein the second language is selected as a regularization language for the first language.

19. The method of claim 11, wherein the one or more processors are further configured to:
   systematically add a third language as a regularization language for the first language during training.

20. A non-transitory machine-readable medium comprising executable code which when executed by one or more processors associated with a computing device are adapted to cause the one or more processors to perform a method comprising:
   obtaining a first dataset of training data in a first language;
   performing one or more training passes of:
      adding a new language to a set of regularization languages different from the first language,
      creating a second dataset of training data translated from the first dataset of training data corresponding to the set of regularization languages,
      training the deep learning module using the second dataset, and
      determining whether a performance improvement metric associated with the trained deep learning module is greater than a threshold; and
   selecting a trained deep learning module with a best performance improvement metric over the one or more training passes.

\* \* \* \* \*